Dec. 20, 1966     W. S. EGGERT, JR     3,292,969
TUBULAR FRAME UNITIZED BODY STRUCTURE
Filed June 5, 1964     4 Sheets-Sheet 1
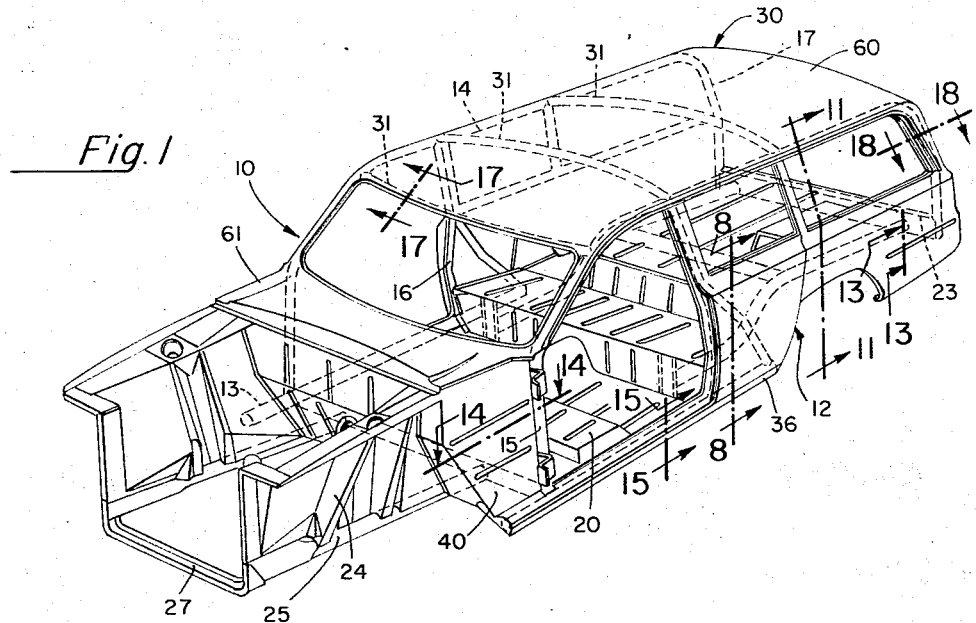
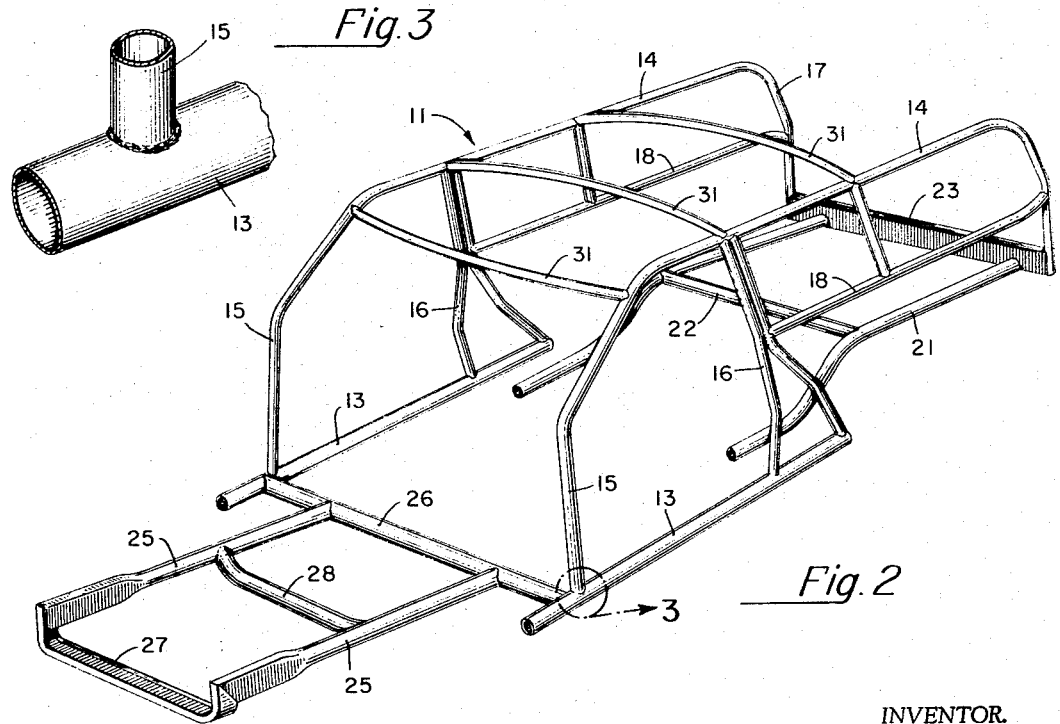
INVENTOR.
WALTER S. EGGERT, JR.
BY
*John B. Sowell*
ATTORNEY

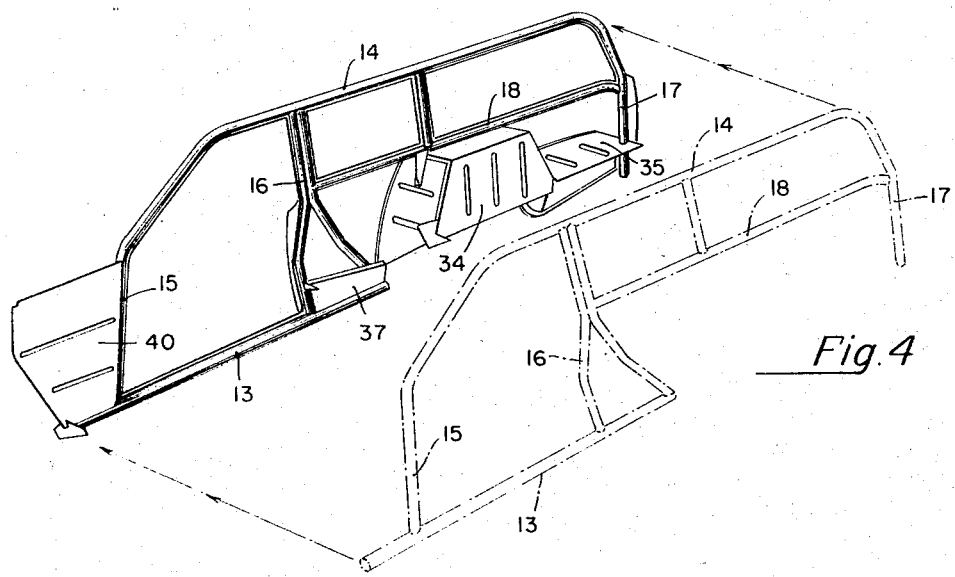
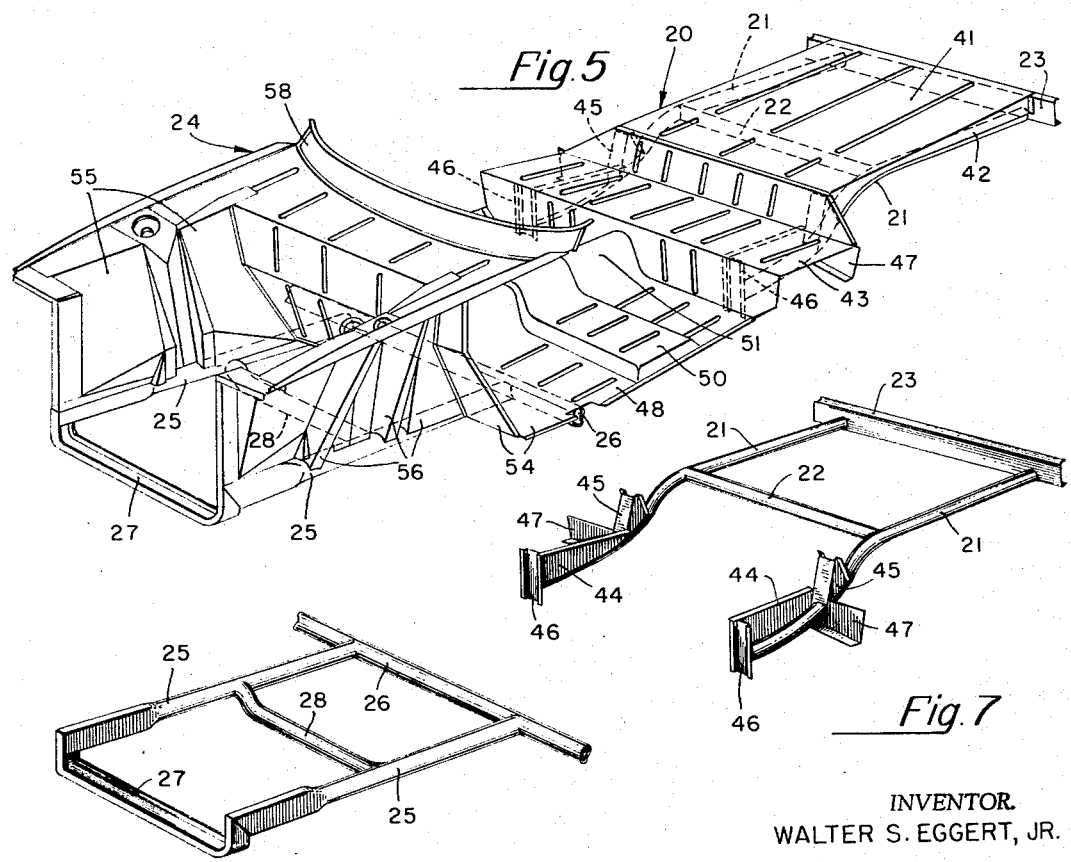

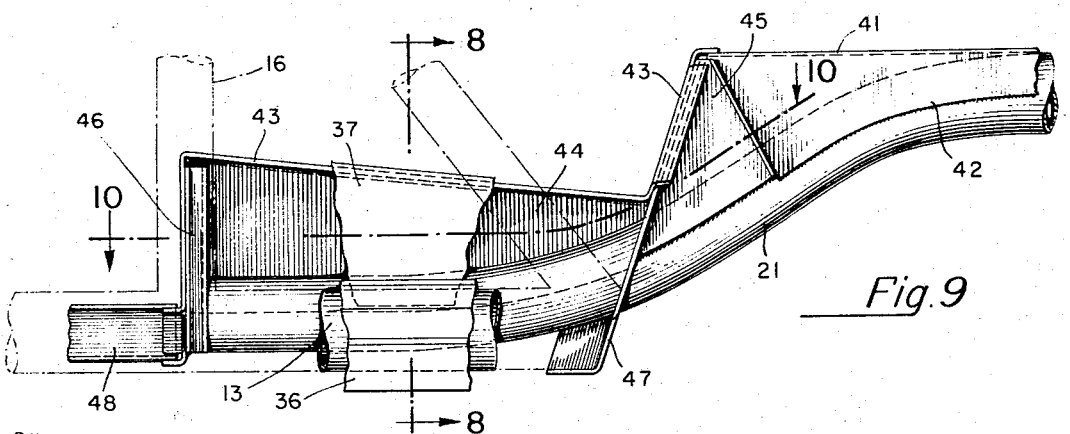
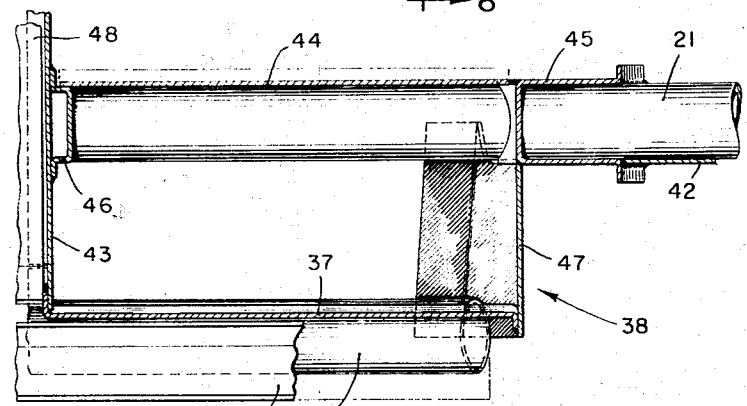
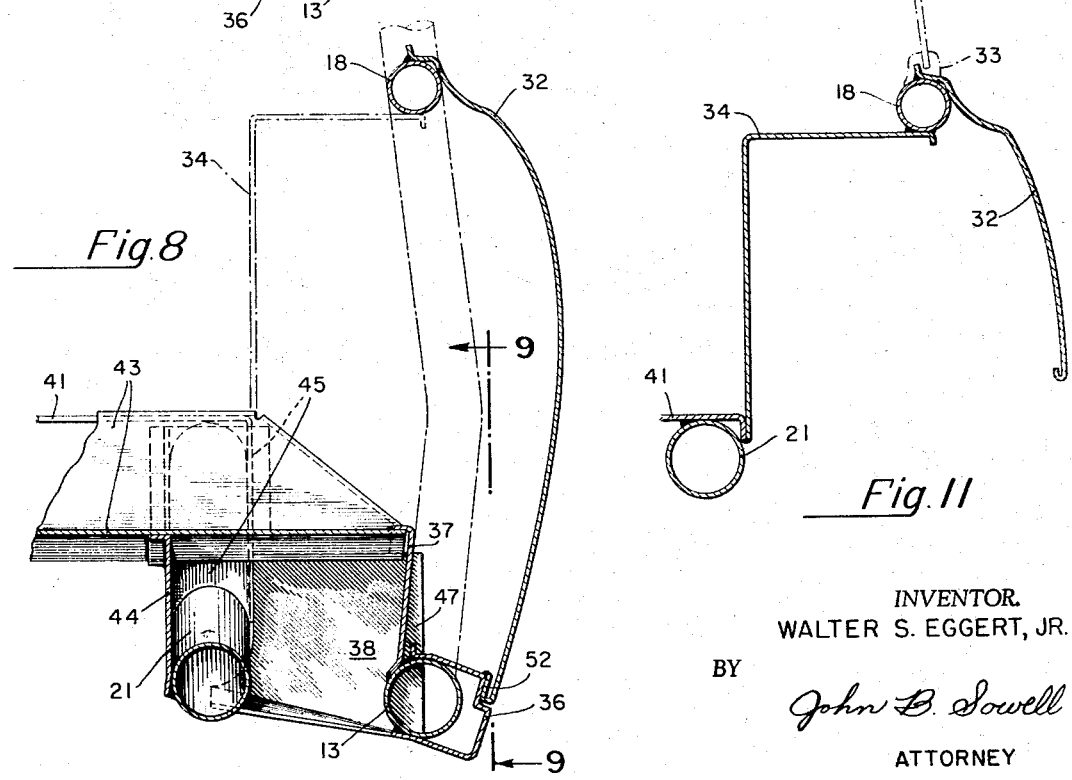

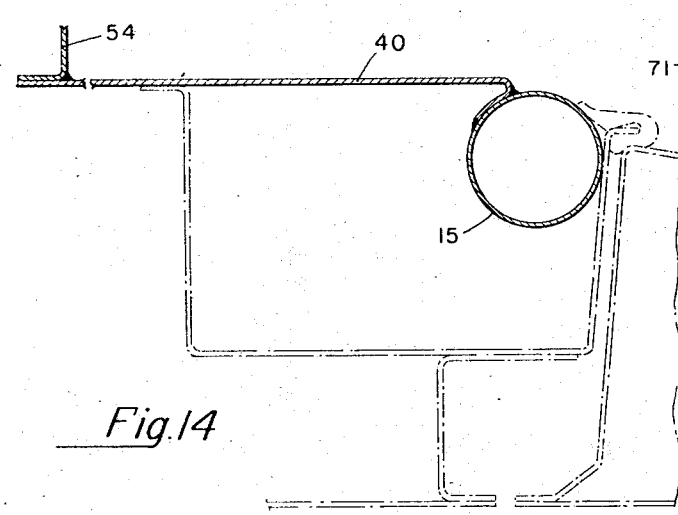
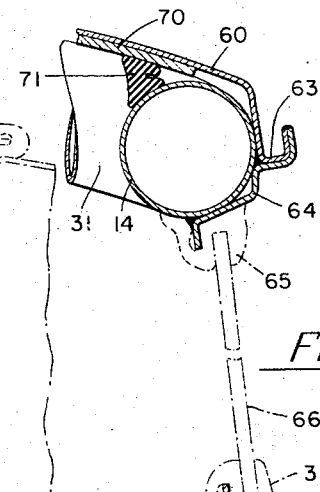
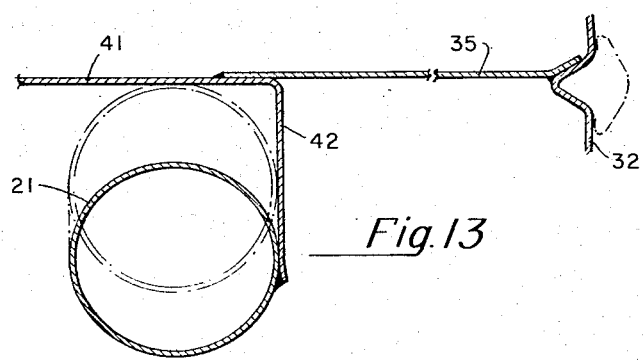
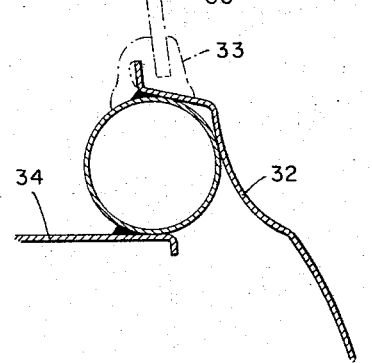
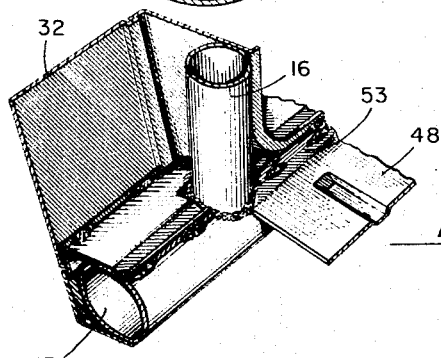
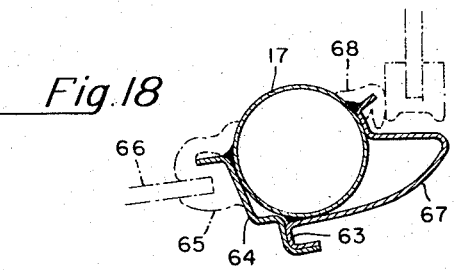
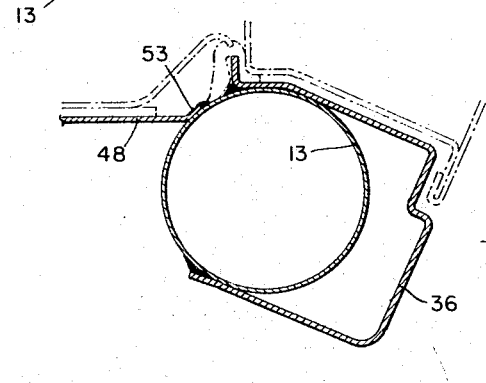
INVENTOR.
WALTER S. EGGERT, JR.

United States Patent Office 3,292,969
Patented Dec. 20, 1966

3,292,969
TUBULAR FRAME UNITIZED BODY STRUCTURE
Walter S. Eggert, Jr., Philadelphia, Pa., assignor to The Budd Company, Philadelphia, Pa., a corporation of Pennsylvania
Filed June 5, 1964, Ser. No. 373,013
1 Claim. (Cl. 296—28)

This invention relates to an improved automobile body structure and more particularly to a unitized-body-frame combining axially loaded tubular frame structures cooperating with load bearing sheet metal body panels.

Before the advent of the modern unitized light-weight sheet metal passenger car, the upper body of a passenger car was fabricated separately as a unit and resiliently connected to a continuous self-supporting underframe. The separate underframe and upper body type of structure is in current use today in a slightly improved form.

A modern unitized passenger car body has no separate upper body and underframe. Numerous individual parts and panels are combined to form a continuous interconnected structure which is rigidly affixed and integral with the upper body. The modern unitized car body is lighter in weight and more rigid than car bodies having separate upper bodies and underframes. Applicant's unitized body combines a unitized sheet metal body concept with a reinforcing frame structure. The assembled body comprises a plurality of subassemblies each having its own reinforcing frame. Before the body is assembled, the reinforcing frame structure does not exist as an interconnected unit and when interconnected forms a discontinuous frame structure. Before the sheet metal panels are reinforced by the frame structure they are not load-carrying members. Novel joints connect the sheet metal panels and the tubular frame structure to provide reinforced load-carrying subassemblies. Interconnections between load-carrying subassemblies occur at or near the frame structure so that it serves as reinforcing frame structure for adjacent assemblies joined to the frame.

Therefore, it is a principal object of the present invention to provide a simplified discontinuous frame-reinforced unitized body structure.

It is another object of the present invention to provide a plurality of sheet metal subassemblies each reinforced by tubular framing members as components of a unitized body structure.

It is a further object of the present invention to provide simplified load-carrying joint structures between sheet metal subassemblies and tubular framing members.

It is another object of the present invention to provide an improved unitized tubular frame and sheet metal body structure interconnectable by arc welding.

Further objects and features of the present invention will become apparent from the following description and the accompanying drawings wherein:

FIG. 1 is a perspective view of an assembled unitized tubular frame body structure according to a preferred embodiment;

FIG. 2 is a perspective view of the discontinuous tubular frame reinforcement for the body structure of FIG. 1;

FIG. 3 is an enlarged perspective view of a joint taken at point 3 of FIG. 2;

FIG. 4 is a perspective view of the left side panel subassembly showing its tubular reinforcing frame members;

FIG. 5 is a perspective view of the floor subassembly and the cowl subassembly showing its tubular frame reinforcing frame members attached thereto;

FIG. 6 is a perspective view of the tubular reinforcing frame members which are attached to the cowl subassembly of FIG. 5;

FIG. 7 is a perspective view of the tubular reinforcing frame members which are attached to the floor subassembly of FIG. 5;

FIG. 8 is an enlarged section through the rear quarter panel of the side panel subassembly taken at lines 8—8 of FIG. 1;

FIG. 9 is an elevation in section taken at lines 9—9 of FIG. 8;

FIG. 10 is a top sectional view taken at lines 10—10 of FIG. 9;

FIG. 11 is an enlarged section in elevation through the wheel housing of the side panel and roof subassemblies taken at lines 11—11 of FIG. 1;

FIG. 12 is an enlarged section in elevation of the roof and window area of FIG. 11 showing the roof rail joint;

FIG. 13 is an enlarged elevation in section taken through the side panel subassembly at lines 13—13 of FIG. 1;

FIG. 14 is an enlarged section in plan view of the joint between the cowl subassembly and the side panel subassembly taken at lines 14—14 of FIG. 1;

FIG. 15 is an enlarged section in elevation of the sidesill and rocker panel joint taken at lines 15—15 of FIG. 1;

FIG. 16 is a perspective view of the joint between the locked pillar member and the sidesill member of the left side panel subassembly looking toward the front of the body structure;

FIG. 17 is an enlarged section of the roof beam joint at the windshield area of the roof subassembly taken at lines 17—17 of FIG. 1;

FIG. 18 is an enlarged section in plan view taken at the rear pillar member showing the side panel, rear window and tail gate window.

Referring now to the drawings, the assembled body structure 10, shown in FIG. 1, is reinforced by frame 11, shown in FIG. 2. Body structure 10 is assembled from a plurality of subassemblies of sheet metal reinforced by portions of the frame 11. Frame 11 is never assembled independently in the form shown. As will be explained, the body structure is assembled by joining together the reinforced cowl and floor subassemblies, as shown in FIG. 5, then adding two side panel subassemblies like those shown in FIG. 4 and completing the body structure by adding the reinforced roof subassembly onto the partially complete body structure.

Each of the side panel subassemblies 12, like those shown in FIG. 4, is reinforced by a frame structure which comprises sidesill 13, roof rail 14, hinge pillar 15, lock pillar 16, rear pillar 17 and belt rail 18.

Floor subassembly 20, shown in FIG. 5, is reinforced by a frame structure shown in FIG. 7, which comprises rear sills 21, shock absorber cross member 22 and rear cross member 23.

Cowl subassembly 24, shown in FIG. 5, is reinforced by a frame structure shown in FIG. 6, which comprises front sills 25, rear cross member 26, front cross member 27 and engine support cross member 28.

Roof subassembly 30, FIGS. 1 and 2, is reinforced by roof beams 31. In the preferred embodiment shown, roof beams 31 are joined to roof rails 14 before being joined to the sheet metal roof panel. However, the roof subassembly 30 may be reinforced prior to assembly to the body structure.

The above-mentioned floor, cowl, and side panel subassemblies are independently fabricated prior to assembly of the body 10. Tubular frame pieces are preformed over bending jigs to a desired predetermined shape and may be interconnected by arc welding while being held in a precision fixture (not shown). The same fixture and the reinforcing frame structure both serve as a precision fixture for the attachment of the sheet metal panels to the frame.

Refer now to FIGS. 4, 8 and 11 to 13, showing the attachment of the sheet metal panels to the reinforcing structure of the side panel subassembly 12 and their interconnection to the body structure 10. Rear quarter panel 32 is attached by arc welding to belt rail 18 along its upper horizontal edge as shown in FIGS. 8, 11 and 12. An upper edge of panel 32 is turned outward to receive a piece of molded rubber 33 which serves as an attractive trim piece and window retainer. Also, attached to belt rail 18 is the rear wheel housing 34 which completely closes off the rear wheel as shown in FIG. 4. Rear wheel housing 34 is attached to the rear quarter panel so as to form a rigid box-like structure over rear sills 21 and shock absorber cross member 22 of the floor subassembly. Rear close-off panel 35 is attached to rear quarter panel 32 and the rear floor pan of the floor subassembly 20 as shown in FIG. 13. The bottom horizontal edge of the rear quarter panel 32 is attached to a rocker panel 36 which, in turn, is attached to sidesill 13. A flat gusset plate 37 is attached to sidesill 13 as shown in FIGS. 8 and 10. Gusset plate 37 forms one side of torsion box 38 as will be explained later. Attached to hinge pillar 15 is a cowl side panel 40, as shown in FIGS. 4 and 14, which connects side panel subassembly 12 to cowl subassembly 24.

Refer now to FIGS. 5, 7 to 11, 13 and 15 showing the connection of the sheet metal panels to the reinforcing frame structure of floor subassembly 20. Rear floor pan 41 is attached to rear cross member 23 at its rearmost edge and has turned longitudinal edges 42 connected to rear sills 21. The forwardmost edge of rear floor pan 41 is attached to a rear seat and bulkhead panel 43 which forms a stepped shaped continuation of rear floor pan 41. Bulkhead panel 43 is supported on rear sills 21 by support plate 44, channel member 45, hat section 46 and angle brace 47 shown in FIGS. 7 to 10. Members 43 to 47 cooperate with flat gusset 37 to form torsion box 38. Torsion box 38 forms an interconnecting structural member to transmit loads between the floor subassembly 20 and the side panel subassembly 12, and as a rigid box structure, forms the forward continuation of wheel housing 34 as shown in FIGS. 8 and 9. Wheel housing 34 and torsion box 38 cooperate to transmit rear wheel loads into side panel subassembly 12 which structurally reacts as a deep I-beam. Front floor pan 48 forms a continuation of rear seat and bulkhead panel 43 and is reinforced by a front seat support 50 and drive shaft housing 51. The inside longitudinal lower edges 52 of side panel subassembly 12 along sidesill 13, gusset 37, wheel housing 34 and rear close-off panel 35 are connected to the outside longitudinal edges 53 of front floor pan 48, rear seat and bulkhead panel 43 and rear floor pan 41 as shown in FIGS. 8 to 11, 15 and 16.

Refer now to FIGS. 1, 2, 5, 6 and 14 showing the connection of the sheet metal panels to the reinforcing frame of the cowl subassembly 24. A U-shaped fire wall 54 is attached to rear cross member 26 and underlies front floor pan 48 of the floor subassembly. Front wheel housing structure 55 is attached at its lower edge to front sills 25. Shock and spring support structures 56 are attached to the front wheel housing structure and also attached to the front sills at their lower end. Inner cowl panel 58 is attached to and forms a continuation of fire wall 54. The inner cowl panel 58 is connected between the two front housing structures forming a rigidifying beam therebetween. The cowl side panel 40 is attached to the lower horizontal edge and the vertical side edge of fire wall 54. The upper horizontal edge of cowl side panel 40 is attached to the upper horizontal edge of the front wheel housing structure. The connection between the fire wall 54 and the cowl side panel is shown in FIG. 14.

Refer now to FIGS. 1, 12, 17 and 18 showing the attachment of the sheet metal panels to the reinforcing structure of the roof subassembly 30. The roof panel 60 is joined to an outer cowl panel 61 forming a continuous sheet structure. The outer cowl panel fits over the inner cowl panel and is attached thereto along its transverse edge. The longitudinal edges of the outer cowl panel 61 are attached to the front wheel housing structure 55. The front transverse edge of roof panel 60 is attached to the front transverse roof beam as shown in FIG. 17 and terminates in an outward extending edge to receive a piece of molded rubber 62 which serves as a sealer and window retainer. A trim piece similar to the forward edge of roof panel 60 extends along the edges of the window interconnecting the roof panel 60 and the outer cowl panel 61 thus providing a continuous edge portion similar to that shown in FIG. 17 completely around the windshield area. The longitudinal edges of roof panel 60 are connected to roof rails 14 as shown in FIG. 12. The longitudinal edges of roof panel 60 are upturned to form a continuous gutter 63 extending from the outer cowl panel 61 rearward along hinge pillar 15 and terminating at belt rail 18. Attached to roof rail 14 and continuous gutter 63 is a window trim piece 64 provided with a downward extending edge portion to receive a piece of molded rubber 65 which serves as an attractive trim piece and window retainer. It will be understood that additional trim pieces are connected along the vertical edges of the rear windows to form a complete retainer for rear windows 66 as shown in FIG. 12. A rear door trim piece 67 is formed as a continuation of roof panel 60 as shown in FIG. 18. The rearward edge of trim piece 67 is turned outward to receive a piece of molded rubber 68 which serves as an attractive trim piece and rear door sealer. Roof beams 31 and roof panel 60 are not welded together. Roof panel 60 is supported by and affixed to roof beams 31 by suitable resilient means 70 so as to prevent drumming and at the same time provide structural roof support as shown in FIG. 12. Rubber moldings 71 such as those shown in FIGS. 12 and 17 may be applied to either side of the roof beams to provide the structural connection between roof panel 60 and roof beams 31. In the preferred embodiment shown, no roof beam is provided at the rear edge of the roof panel 60, this edge is turned downward and reinforced by a cross member (not shown).

The welded interconnection between the frame members of FIG. 2 is illustrated in detail in FIGS. 3 and 16. These interconnections are made when the subassembly reinforcing frames are fabricated. When the side panel subassemblies are connected to the floor and cowl subassemblies a weld connection is made at the rear pillar and another opposite the hinge pillar.

While a single preferred embodiment has been explained it should be apparent that interconnections of side panel subassemblies 12 to the floor and cowl subassemblies would remain the same even if the side panel subassemblies were modified to transform the preferred embodiment shown into a truck, a pick-up truck or a sedan.

The present tubular frame reinforced subassembly body differs substantially from the rigid tubular frame body designed merely to support outer body panels. Patent No. 2,269,451 is typical of the rigid tubular frame type body having through-running rails which require extensive cross-bracing to rigidify the floor platform. Structures of the rigid tubular frame body type are extremely difficult to assemble precisely, and with the exception of racing cars having ultralight aerodynamic outer panels draped on the tubular frame, have a low strength-to-weight ratio.

The present tubular frame reinforced subassembly body provides an extremely strong and rigid body having high strength-to-weight ratio. Sheet metal unitized bodies employ special shaped sills and unisides die-formed to provide high strength in the individual shapes. In the present tubular frame reinforced subassembly body the individual subassemblies are integrally welded to sheet metal panels so that the subassembly acts as a structural member enabling the use of tubular reinforcing members throughout the unitized body structure. For example, the side panel subassemblies are structurally deep I-beams, the cowl subassembly is a rigid open box, the rear floor and bulkhead panel, when combined with the rear wheel housing structure as shown in FIG. 8 is a Z-section and when combined with the side panels becomes a rigid open box. The front floor pan, when connected to the fire wall and the side panel subassemblies and the rear seat and bulkhead panel also form an open box. While such box structures are not a new concept in the unitized body art, the connections between subassemblies forming junctions at the tubular frame reinforcing members provide an improved and simplified unitized body greatly reducing the cost of manufacture and simplifying both the manufacture of the structural members and their assembly. Unitized bodies, because of their rigidity, ordinarily produce areas of stress concentration at the junction of the above-mentioned boxes. However, at the junction of the above-mentioned boxes the tubular reinforcing frame members are not interconnected as a rigid tubular frame and stresses that do occur are transferred uniformly along the edges of the plate and panel members to the tubular members and vice versa.

It is apparent that some changes or modifications may be made in the arrangement of the reinforcing members and the subassemblies of the combination without departing from the scope of the present invention which is only limited by the appended claim.

What is claimed is:

A tubular reinforced unitized integral automobile body comprising:

a cowl assembly having, a reinforcing frame comprising longitudinal tubular front sills interconnected with a transverse rear cross member, a front wheel housing panel including, a fire wall panel having a pair of opposed vertical side edges and a lower horizontal edge extending therebetween, said fire wall panel being connected to said front sills and said cross member, and a pair of cowl side panels, a cowl side panel being connected on each of said vertical side edge and to said lower horizontal edge of said fire wall panel, a floor sub-assembly having, a front floor pan connected to said fire wall panel and said transverse rear cross member of said cowl sub-assembly, a rear floor pan, a rear seat and bulkhead panel positioned between and interconnecting said front floor pan and said rear floor pan, a reinforcing frame comprising longitudinal tubular rear sills connected to said rear floor pan along its longitudinal outside edges, and a rear cross member connected to said rear sills and to said rear floor pan along its transverse rear edge, and a torsion box connecting said rear seat and bulkhead panel to said rear sills, a pair of side panel sub-assemblies connected to said cowl assembly, and said floor sub-assembly, each having a rear quarter panel, a rear wheel housing connected to said rear quarter panel, said rear floor pan and said rear seat and bulkhead panel, a gusset member connected to said rear seat and bulkhead panel, a reinforcing frame comprising a longitudinal tubular side-sill parallel to and spaced outwardly from said front sill and said rear sill, a roof rail member, a vertical tubular member forming a first lock pillar member connected to said side sill and said roof rail member, a rear pillar member connected to said roof rail member and said rear cross member, and a U-shaped tubular member forming a hinge pillar member and connected to said roof rail member and said side sill, a second lock pillar member connected to said first lock pillar member, to said roof rail and to said side sill and a belt rail member connected to said rear pillar member and said second lock pillar member, said reinforcing frame being connected to said rear quarter panel and said rear wheel housing, each of said side sills being connected to said transverse rear cross member, said fire wall panel of said cowl sub-assembly and said front floor pan for forming a rigid box therewith for connecting said side panel sub-assemblies, said floor sub-assembly and said cowl sub-assembly, said reinforcing frame also being connected to said gusset plate forming a side of said torsion box of said floor sub-assembly for further connecting said floor sub-assembly to said side panel sub-assemblies, said cowl side panel on each side of said cowl sub-assembly being connected to one of said hinge pillars for further connecting said cowl sub-assembly and said side panel sub-assemblies, and a roof sub-assembly comprising transverse roof beams interconnecting said side panel sub-assemblies and a roof panel supported on said roof beams and interconnected to said roof rails of said side panels for further connecting said roof sub-assembly and said side panel sub-assemblies, said interconnected sub-assemblies being connected to form a tubular reinforced unitized automobile body.

References Cited by the Examiner

UNITED STATES PATENTS

| | | | |
|---|---|---|---|
| 2,269,451 | 1/1942 | Ford | 296—28 |
| 2,389,907 | 11/1945 | Helmuth | 296—28 |
| 2,851,302 | 9/1958 | Owen | 296—28 |
| 3,084,971 | 4/1963 | Schilberg | 296—28 |

OTHER REFERENCES

Article, "Humber Body Production" in "The Automobile Engineer," February 1937, page 72.

MILTON BUCHLER, *Primary Examiner.*

BENJAMIN HERSH, *Examiner.*

E. E. PORTER, *Assistant Examiner.*